United States Patent [19]

Meeks

[11] Patent Number: 5,250,865
[45] Date of Patent: Oct. 5, 1993

[54] ELECTROMAGNETIC THRUST BEARING FOR COUPLING A ROTATABLE MEMBER TO A STATIONARY MEMBER

[75] Inventor: Crawford R. Meeks, Woodland Hills, Calif.

[73] Assignee: AVCON - Advanced Controls Technology, Inc., Northridge, Calif.

[21] Appl. No.: 876,586

[22] Filed: Apr. 30, 1992

[51] Int. Cl.⁵ .............................................. H02K 7/09
[52] U.S. Cl. .................................................. 310/90.5
[58] Field of Search ..................... 310/90, 90.5, 68 B

[56] References Cited

U.S. PATENT DOCUMENTS

| | | |
|---|---|---|
| 3,890,019 | 6/1975 | Boden et al. . |
| 3,976,339 | 8/1976 | Sabnis . |
| 4,037,886 | 7/1977 | Boden et al. . |
| 4,072,370 | 2/1978 | Wasson . |
| 4,080,012 | 3/1978 | Boden et al. . |
| 4,128,280 | 12/1978 | Purtschert . |
| 4,180,296 | 12/1979 | Habermann ..................... 310/90.5 |
| 4,405,286 | 9/1983 | Studer . |
| 4,563,046 | 1/1986 | Shimamoto . |
| 4,583,794 | 4/1986 | Takahara et al. . |
| 4,597,613 | 7/1986 | Sudo . |
| 4,626,764 | 12/1986 | Habermann et al. ............. 310/90.5 |
| 4,652,780 | 3/1987 | Murakami et al. ................ 310/90.5 |
| 4,812,694 | 3/1989 | Fremery ............................ 310/90.5 |
| 4,866,318 | 9/1989 | Habermann et al. ............. 310/90.5 |
| 4,885,491 | 12/1989 | Hiyama et al. .................... 310/90.5 |
| 4,889,039 | 12/1989 | Miller ............................ 310/90.5 X |
| 4,895,023 | 1/1990 | Roubinet et al. ............. 310/90.5 X |
| 4,900,962 | 2/1990 | Hockney et al. ................. 310/90.5 |
| 4,918,345 | 4/1990 | Vaillant de Guelis et al. ... 310/90.5 |
| 4,920,290 | 4/1990 | Murakami et al. ................ 310/90.5 |
| 4,928,561 | 5/1990 | Fouche ......................... 310/90.5 X |
| 4,942,321 | 7/1990 | Kanemitsu ........................ 310/90.5 |
| 4,946,345 | 8/1990 | Watanabe et al. . |
| 4,947,067 | 8/1990 | Habermann et al. .......... 310/90.5 X |
| 4,956,571 | 9/1990 | Gordon et al. .................... 310/90.5 |
| 4,964,147 | 10/1990 | Laurent et al. . |
| 4,976,177 | 12/1990 | Fouche ............................. 310/90.5 |
| 4,982,126 | 1/1991 | Jolivet et al. ......................... 310/90 |
| 4,983,869 | 1/1991 | Vaidya et al. ..................... 310/90.5 |
| 4,988,906 | 1/1991 | Littlefield .......................... 310/90.5 |
| 5,012,359 | 4/1991 | Kohno et al. . |
| 5,021,697 | 6/1991 | Kralick .............................. 310/90.5 |
| 5,027,280 | 6/1991 | Ando et al. ..................... 310/90.5 X |
| 5,072,146 | 12/1991 | New ................................... 310/90.5 |

FOREIGN PATENT DOCUMENTS 2841256 4/1980 Fed. Rep. of Germany .
59-43220 3/1984 Japan .

*Primary Examiner*—Steven L. Stephan
*Assistant Examiner*—Ed To
*Attorney, Agent, or Firm*—Kelly, Bauersfeld & Lowry

[57] ABSTRACT

An electromagnetic thrust bearing couples a rotatable member relative to a stationary member utilizing a combination of arcuately shaped constant flux permanent magnets and controllable electromagnets, each physically associated with the stationary member. More particularly, the rotatable member comprises a shaft having a radially extending thrust disc fixed thereto. A pair of solenoids are disposed about the rotatable member in facing relation on opposite sides of the thrust disc. The facing solenoids are capable of generating a controllable electromagnetic field. A constant flux high density magnetic field is generated between the solenoid housings and the thrust disc by a pair of axially polarized arcuately shaped permanent magnets disposed on each side of the thrust disc. Each pair of permanent magnets has an inner magnet and an outer magnet radially separated from one another. Each permanent magnet is linked magnetically to the adjacent solenoid housing by respective ferromagnetic pole pieces. A sensor determines the axial positioning of the rotatable member relative to the stationary member and provides input for controlling the positioning of the thrust disc by varying the magnetic flux generated by the solenoids.

19 Claims, 1 Drawing Sheet

ELECTROMAGNETIC THRUST BEARING FOR COUPLING A ROTATABLE MEMBER TO A STATIONARY MEMBER

BACKGROUND OF THE INVENTION

This invention relates generally to improvements in magnetic bearing structures. More particularly, the present invention relates to a magnetic thrust bearing which utilizes a combination of controllable electromagnets and constant flux permanent magnets associated with a stationary member, to axially flux couple a rotatable member to the stationary member.

Electromagnetic bearings are highly effective for supporting a body, such as a rotating shaft, which is effectively floated or levitated by magnetic fields. In this way the rotating shaft has no frictional contact with any stationary structure, thereby permitting relatively friction free rotation of the shaft or rotation of a body about the shaft. This arrangement possesses the obvious advantage that there is no mechanical abrasion, which results in reduced mechanical noise and durability not available with other types of bearing structures. Moreover, because of the reduced frictional effects which would otherwise be encountered with conventional bearing structures, it is possible to obtain higher speeds of rotation with electromagnetic bearings.

Magnetic bearings typically require little maintenance and readily lend themselves to operation in hostile environments such as in connection with corrosive fluids where other conventional bearings would be destroyed or rendered inoperable. Further, magnetic bearings are suitable for supporting moving bodies in a vacuum, such as in outer space, or in canned pumps where the pump rotor must be supported without the use of physically contacting bearings.

One of the primary considerations in the development of magnetic bearing structures is to eliminate so-called air gaps. The so-called air gaps form a portion of the magnetic flux pathway of the electromagnets and permanent magnets, and provide a bridge between a supporting structure and a levitated structure. In actuality, some air gaps must be tolerated in order to position a suspended or rotatable body. Thus, air gaps to some extent cannot be avoided, but it is desirable to reduce air gaps to an absolute minimum.

From a pure physics standpoint, an air gap introduces great inefficiency into any type of magnetic structure. An air gap is about 2,000 times less efficient than an iron core medium for transmitting magnetic flux. Thus, in terms of inefficiency, a magnetic bearing structure which has an air gap of 0.1 inch is far more inefficient than a magnetic bearing which has an iron gap of 20 inches.

In addition, it is important to overcome the conductivity constraints of permanent magnets. Essentially, permanent magnets are very poor conductors for a magnetic flux, even though they generate magnetic flux. The most efficient permanent magnets available are the rare earth alloy magnets. Such permanent magnets, however, have a very low magnetic permeability and they behave in much the same manner as air gaps in the magnetic circuit. The low permeability of rare earth alloy magnets requires significant power to drive electromagnetic fields through the permanent magnets, thereby resulting in low electrical efficiencies. Thus, it is undesirable to transmit an electromagnetic field through a permanent magnet.

Early magnetic thrust bearings consisted of two solenoids positioned on each side of a rotatable disc which is an integral part of the supported shaft. Such early designs utilized the electromagnetic solenoid coils to create a magnetic field in the two air gaps between the solenoids and the rotatable disc. A position sensor measured the disc axial location and a closed loop servo system maintained the shaft in the desired axial location. The entire magnetic field between the disc and the solenoids was generated by electric currents in the solenoid coils. Further, a large bias current was normally applied to the coils to generate a magnetic field and to linearize the relationship between input current and force produced on the disc. This method simplified the design of the servo controls.

There were several disadvantages of this early approach. First, very large electromagnet coils were required because of the requirement to generate and maintain continuously the entire magnetic field in the air gaps. Secondly, large amounts of input electrical power were required to maintain the magnetic fields, which resulted in a large electronics control system. Thirdly, two power amplifiers were required to develop by-directional forces since the electromagnets were only capable of producing attraction forces.

Many of these disadvantages have been overcome by incorporating permanent magnets into thrust bearings. Newer types of magnetic thrust bearings utilize a radially polarized permanent magnet disc which forms an integral part of the rotatable disc. Two solenoids disposed about the thrust disc in facing relation on opposite sides thereof are utilized as before. This improved design has the advantages of linearizing the force versus solenoid control current, greatly reducing the required electrical power to develop forces on the disc, and reducing the size of the solenoids because the electromagnet coils must only provide control magnetic fields, not the primary magnetic field.

This improved approach, however, continues to suffer several significant drawbacks and disadvantages. In particular, radially polarized permanent magnets are difficult to produce, and, in fact, usually must be fabricated from a number of arc-shaped segments of permanent magnet material bonded to one another. Further, high shaft speeds produce centrifugal loads that can over-stress the magnets and thrust disc rings. This particular drawback has effectively limited use of the improved-design magnetic thrust bearings in applications where high shaft speeds are encountered.

Accordingly, there has been a need for a novel magnetic thrust bearing which utilizes a combination of constant flux permanent magnets and controllable electromagnets for coupling a rotatable member relative to a stationary member, in a compact and spacially efficient structure which is lightweight and obtains a high power efficiency. Additionally, there exists a need for a magnetic thrust bearing wherein magnetic efficiency of the device is optimized by minimizing air gaps between the levitated and support structures, and wherein the electromagnetic coils are not required to provide magnetomotive forces to drive magnetic flux through the permanent magnets. Moreover, a novel magnetic thrust bearing is needed which can utilize axially polarized permanent magnets, and associates such magnets with the stationary member to overcome the drawbacks noted in connection with the prior devices. The present

SUMMARY OF THE INVENTION

The present invention resides in an improved electromagnetic thrust bearing for axially flux coupling a rotatable member relative to a stationary member. The electromagnetic thrust bearing comprises, generally, a thrust disc fixed to and extending radially from the rotatable member, and means associated with the stationary member for generating a constant flux high density magnetic field linking the thrust disc to the stationary member. Means associated with the stationary member are also provided for generating a controllable electromagnetic field linking the thrust disc to the stationary member. The constant flux magnetic field generating means and the controllable electromagnetic field generating means cooperatively axially position the rotatable member relative to the stationary member. The arrangement of the electromagnetic thrust bearing of the present invention utilizes a unique combination of permanent magnets and electromagnets in a system requiring only one amplifier. Further, the drawbacks of prior designs have been eliminated since the present design accommodates the use of arcuate, axially polarized permanent magnets placed on a stationary housing rather than on a portion of the rotatable member.

In its most basic form, the electromagnetic thrust bearing of the present invention generates a high density magnetic flux directed through a minimum number of air gaps between the rotatable member and the stationary member. This provides a generally uniform magnetic field surrounding a portion of the rotatable member which, under perfect conditions, could theoretically suspend or levitate the rotatable member axially with respect to the stationary member. Such perfect conditions rarely exist, and certainly do not persist in an operating environment, and thus any axial displacement of the rotatable member relative to the stationary member will cause the rotatable member to be axially drawn into contact with a portion of the stationary member. This is known as the "negative spring" effect created by a constant magnetic field.

In order to counteract the "negative spring" effect, the present invention utilizes a controllable, variable flux electromagnetic field in connection with the thrust bearing to stabilize the rotatable member in an optimum axially centered position relative to the stationary member. Variations in the positioning of the rotatable member are neutralized by an active electromagnetic servo control system which produces a "positive spring" effect, that is, a high stiffness restoring force. The present invention utilizes a sensor which is positioned to detect axial displacement of the rotatable member relative to the stationary member. A servo control circuit, receiving input from the sensor, can correct for any axial displacement of the levitated member by controlling the electromagnetic field forces. In this way, signals from the position sensor enable the servo control system to stabilize the rotatable member and maintain it in an optimal axially centered position.

In a preferred form of the invention, the electromagnetic thrust bearing, which axially flux couples the rotatable member to the stationary member, utilizes a thrust disc which extends radially outwardly from the body of the rotatable member. First means for generating an axially polarized, controllable electromagnetic field is associated with the stationary member and disposed adjacent to a first side of the thrust disc. The first electromagnetic field generating means includes a first solenoid having a first electromagnetic coil situated within a first ferromagnetic housing which circumscribes a portion of the rotatable member. Second means for generating an axially polarized, controllable electromagnetic field is associated with the stationary member and disposed adjacent to a second side of the thrust disc. The second electromagnetic field generating means includes a second solenoid having a second electromagnetic coil situated within a second ferromagnetic housing which circumscribes a portion of the rotatable member.

First means for generating a constant flux, high density magnetic field is associated with the stationary member and disposed adjacent to the first side of the thrust disc. The first constant flux magnetic field generating means includes a first pair of arcuately shaped, axially polarized permanent magnets which are radially spaced from one another and linked magnetically to the first ferromagnetic housing by respective ferromagnetic pole pieces. The first pair of radially separated permanent magnets are each linked magnetically to the thrust disc through a first air gap such that axially directed flux from the first pair of permanent magnets passes through the first air gap to create a high density magnetic field between the thrust disc and the stationary member.

Second means for generating a constant flux, high density magnetic field associated with the stationary member and disposed adjacent to the second side of the thrust disc. The second constant flux magnetic field generating means includes a second pair of arcuately shaped, axially polarized permanent magnets which are radially spaced from one another and linked magnetically to the second ferromagnetic housing by respective ferromagnetic pole pieces. The second pair of radially separated permanent magnets are each linked magnetically to the thrust disc through a second air gap such that axially directed flux from the second pair of permanent magnets passes through the second air gap to create a high density magnetic field between the thrust disc and the stationary member.

Means are provided for directing substantially all magnetic flux from the first and second electromagnetic field generating means and the first and second constant flux magnetic field generating means, axially between the thrust disc and the stationary member. This magnetically links the thrust disc to the solenoids and provides a magnetic flux path for the electromagnetically generated flux around the permanent magnets and the electromagnetic coils, and provides controlled magnetic flux coupling of the rotatable member to the stationary member.

A position sensor situated adjacent to a portion of the rotatable member provides means for determining the axial position of the rotatable member relative to the stationary member. A servo control system provides means for controlling the axial positioning of the thrust disc by varying the magnetic flux generated by the first and second electromagnetic field generating means. More specifically, the electromagnetic coils of the solenoids are controlled through the servo control system in order to provide the desired amount of electromagnetic flux and to thereby control the electromagnetic field surrounding the thrust disc. The construction of the electromagnetic thrust bearing of the present invention permits the flux generated by the electromagnetic coils to be varied in order to obtain optimum positioning of the rotatable member, without requiring the controllable, variable magnetomotive force to drive flux through a permanent magnet. In this manner, the structure maintains a high degree of power efficiency.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
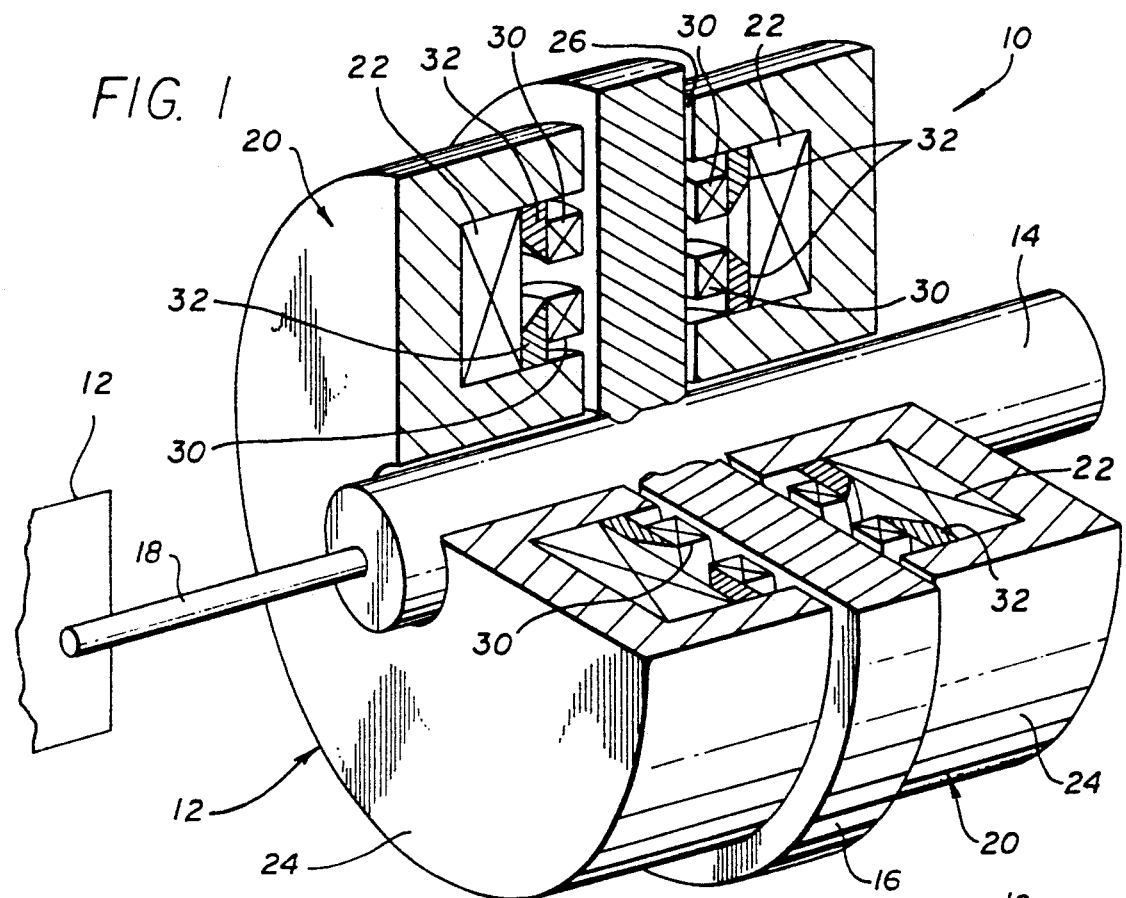
FIG. 1 is a partially sectional perspective view of an electromagnetic thrust bearing embodying the invention, illustrating the use of two solenoids in relation to a thrust disc to provide means associated with the stationary member for generating a controllable electromagnetic field linking the thrust disc to the stationary member, and a pair of axially polarized, radially spaced permanent magnets associated with each solenoid and linked magnetically thereto by respective ferromagnetic pole pieces, which provide means for generating a constant flux high density magnetic field also linking the thrust disc to the stationary member.

As shown in the drawings for purposes of illustration, the present invention is concerned with an improved electromagnetic thrust bearing, generally designated in the accompanying drawings by the reference number 10. The thrust bearing 10 comprises a stationary outer housing 12 and a cylindrical rotatable shaft 14 which extends axially through the housing 12. The shaft 14 includes a radially extending thrust disc 16 which is generally enveloped by portions of the stationary outer housing 12. The electromagnetic thrust bearing 10 generates a high density controllable magnetic field generally surrounding the thrust disc 16, to axially flux couple the shaft 14 to the housing 12.

The electromagnetic thrust bearing 10 of the present invention is controlled by a one-axis servo control system. Only one position sensor 18 need be associated with the thrust bearing 10 to detect and compensate for axial displacement of the shaft 14 relative to the housing 12.

Figure 2:
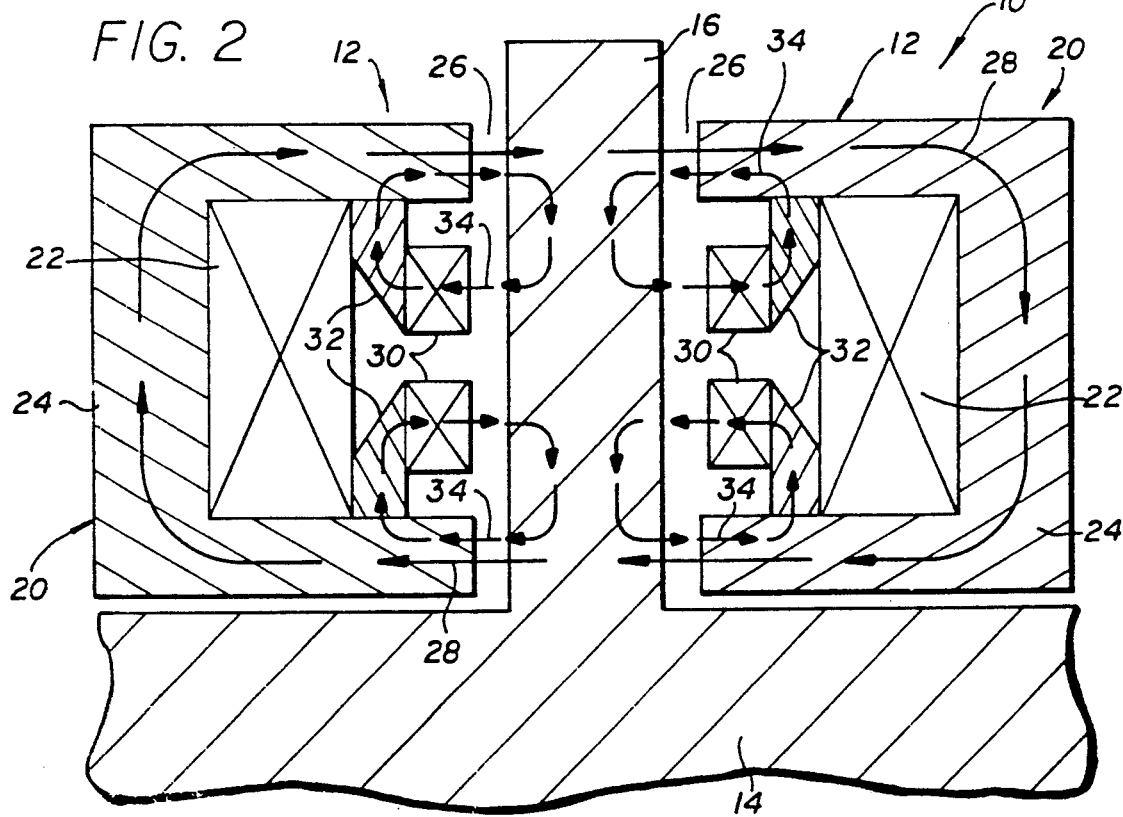
FIG. 2 is an enlarged fragmented sectional elevational view of the magnetic thrust bearing illustrated in FIG. 1, showing exemplary magnetic flux paths generated by each of the four axially polarized arcuately shaped permanent magnets, and an exemplary magnetic flux path generated by the controllable solenoids.

In accordance with the present invention, and as illustrated in FIGS. 1 and 2, the stationary outer housing 12 supports a pair of solenoids 20 which are disposed about the shaft 14 in facing relation on opposite sides of the thrust disc 16. Each solenoid 20 includes a controllable electromagnetic coil 22 situated within a ferromagnetic coil housing 24. The coil housings 24 generally surround the thrust disc 16 with very small air gaps 26 of approximately 0.007 inch. The electromagnetic coils 22 are connected to have opposite polarities so that the solenoids 20 operate in concert to develop additive forces on the thrust disc 16, as shown by the flux arrows 28 in FIG. 2.

Associated with each solenoid 20 are a pair of arcuately shaped, axially polarized permanent magnet rings 30. The pair of permanent magnet rings 30 associated with each solenoid 20 are radially spaced from one another and linked magnetically to the coil housing 24 of the respective solenoid 20 by ferromagnetic pole pieces 32. The axially polarized permanent magnet rings 30 are arranged so as to generate axially flowing magnetic fields in the air gaps 26 between the coil housings 24 and the rotating thrust disc 16 as shown by the flux path arrows 34. The permanent magnet rings 30, which generate an axially polarized, constant flux, high density magnetic field generally surrounding a portion of the shaft 14, provide the primary flux coupling of the housing 12 (and specifically the coil housings 24) to the shaft 14 (specifically the thrust disc 16).

With the foregoing basic construction of the electromagnetic thrust bearing 10 in mind, its function will described in greater detail. The permanent magnet rings 30 generate axially polarized magnetic fields having magnetic flux paths illustrated by the arrows having the reference number 34 (FIG. 2). The permanent magnets 30 generate a relatively constant, high density magnetic flux which is conducted through the respective ferromagnetic pole piece 32 radially from the permanent magnet ring to the supporting portion of the respective ferromagnetic coil housing 24. The flux path 34 extends axially through the ferromagnetic coil housing 24 and across the respective air gap 26 to an adjacent portion of the thrust disc 16. Within the thrust disc 16, the flux 34 is redirected radially and then axially once again across the air gap 26 toward or away from the permanent magnet ring 30 itself. It will be noted that the magnetic flux 34 generated by the axially polarized permanent magnet rings 30 is directed axially through only a single air gap 26 between the thrust disc 16 and the respective ferromagnetic coil housing 24, for each permanent magnet ring, to provide magnetic flux coupling of the shaft 14 to the housing 12.

Under perfect conditions, and assuming no radial or moment loading upon the shaft 14, if the shaft were to be precisely centered between the solenoids 20 so that uniform air gaps 26 existed completely around the thrust disc 16, then, theoretically, the high density magnetic fields produced by the permanent magnet rings 30 would create an axially directed force system which was metastable. However, any axial travel of the shaft 14 will cause the thrust disc 16 to be drawn toward one of the solenoids 20. This is the so-called "negative spring" effect of the constant magnetic field provided by the permanent magnet rings 30.

The active control electromagnetic coils 22 positioned about the shaft 14 within the coil housings 24 are controlled by a servo circuit to counteract the "negative spring" effect and produce a "positive spring," that is, a high stiffness restoring force which keeps the thrust disc 16 centered between the solenoids 20. The reference number 28 identifies an exemplary magnetic flux path of flux generated by the active control electromagnetic coils 22 (FIG. 2). Each of the electromagnetic coils 22 is capable of generating an axially polarized, controllable electromagnetic field, wherein the flux path 28 is directed across both of the air gaps 26 and conducted peripherally around the electromagnetic coils 22 and the permanent magnet rings 30.

In use, the axially polarized, constant flux magnetic fields generated by the permanent magnet rings 30, tend to cause the thrust disc 16 to displace from a true centered position between the solenoids 20 and into engagement with one solenoid or the other. Such displacement is sensed by the Z-axis position sensor 18 which provides input to a servo circuit. An exemplary servo circuit is described in U.S. Pat. No. 5,111,102. The servo circuit selectively controls electrical current to the active control electromagnetic coils 22 in order to provide a positive gradient which keeps the thrust disc 16 in a true centered position. The greater the displacement of the shaft 14, the greater the restoring force generated by the use of the servo circuit and the electromagnetic coils 22. Thus, a high density magnetic field is produced through the air gaps 26, which produces an axial force system which is metastable when the thrust disc 16 is centered between the solenoids 20.

Energizing the paired electromagnetic coils 22 results in an electromagnetic flux 28 that produces changes in the total magnetic flux in the air gaps 26 surrounding the thrust disc 16. The changes add to or reduce the magnetic fields generated by the permanent magnet rings 30 in the associated air gaps 26. Consequently, controllable magnetomotive forces are produced by modulating the current in the electromagnetic coils 22.

The electromagnetic thrust bearing 10 is designed so that the electromagnetic flux 28 generated by the electromagnetic coils 22 takes a different path than the permanent magnet flux 34 generated by the permanent magnet rings 30. This greatly improves the electrical efficiency of the thrust bearing 10 because the electromagnetic coils 22 do not have to drive magnetic flux through the permanent magnet rings 30, which have a very high resistance to conducted magnetic fields.

From the foregoing it is to be appreciated that the improved electromagnetic thrust bearing 10 of the present invention is capable of providing controlled thrust load support of the shaft 14 relative to the housing 12. The disclosed thrust bearing 10 produces a compact and spacially efficient system which requires only one amplifier for controlling the electromagnetic coils 22, thus minimizing control electronics associated with the electromagnetic thrust bearing 10. Further, the thrust bearing 10 of the present invention overcomes drawbacks noted in connection with prior designs in that permanent magnets are utilized in connection with controllable electromagnetic coils to increase the power efficiency of the structure. Moreover, the placement of permanent magnet rings 30 on the stationary solenoids 20 avoids over-stressing of the thrust disc 16 parts as well as the permanent magnets themselves at high speeds due to centrifugal loads. Additionally, the design of the electromagnetic thrust bearing 10 permits use of axially polarized permanent magnets which are more producable and commercially available at less cost than similar radially polarized cylindrical magnets.

Although a particular embodiment of the invention has been described in detail for purposes of illustration, various modifications may be made without departing from the spirit and scope of the invention. Accordingly, the invention is not to be limited, except as by the appended claims.

I claim:

1. An electromagnetic thrust bearing for coupling a rotatable member relative to a stationary member, the thrust bearing comprising:

a thrust disc fixed to and extending radially from the rotatable member;

means associated with the stationary member, for generating a constant flux high density magnetic field linking the thrust disc to the stationary member; and means associated with the stationary member, for generating a controllable electromagnetic field linking the thrust disc to the stationary member, including a pair of solenoids disposed about the rotatable member in facing relation on opposite axially-facing sides of the thrust disc;

wherein the constant flux magnetic field generating means and the controllable electromagnetic field generating means cooperatively axially position the rotatable member relative to the stationary member.

2. An electromagnetic thrust bearing as set forth in claim 1, wherein the constant flux magnetic field generating means is linked magnetically to the thrust disc through two air gaps such that axially directed flux from the constant flux magnetic field generating means passes through the air gaps to create a high density magnetic field linking the rotatable member to the stationary member.

3. An electromagnetic thrust bearing as set forth in claim 1, wherein each solenoid includes a controllable electromagnetic coil situated within a ferromagnetic housing, and wherein at least one such housing circumscribes a portion of the rotatable member.

4. An electromagnetic thrust bearing as set forth in claim 3, wherein the solenoids are axially aligned with one another and cooperatively generated a controllable, axially polarized, electromagnetic field to magnetically link the thrust disc to the solenoids and provide a magnetic flux path for electromagnetically generated flux around the constant flux magnetic field generating means and the electromagnetic coils.

5. An electromagnetic thrust bearing as set forth in claim 2, wherein the constant flux magnetic field generating means includes a first arcuately shaped permanent magnet disposed adjacent to each axially facing side of the thrust disc and separated therefrom by a respective one of the air gaps.

6. An electromagnetic thrust bearing as set forth in claim 5, wherein the permanent magnets are each linked magnetically to the stationary member by respective ferromagnetic pole pieces.

7. An electromagnetic thrust bearing as set forth in claim 5, wherein the constant flux magnetic field generating means includes a second arcuately shaped permanent magnet disposed adjacent to each axially facing side of the thrust disc and radially spaced from the first arcuately shaped permanent magnet.

8. An electromagnetic thrust bearing as set forth in claim 5, wherein the arcuately shaped permanent magnets are axially polarized.

9. An electromagnetic thrust bearing as set forth in claim 1, including sensor means for determining axial positioning of the rotatable member relative to the stationary member, and for controlling positioning of the thrust disc by varying the magnetic flux generated by the controllable electromagnetic field generating means.

10. An electromagnetic thrust bearing for axially flux coupling a rotatable member relative to a stationary member, the thrust bearing comprising:

a thrust disc fixed to and extending radially from the rotatable member, the thrust disc having first and second opposite, axially facing, sides;

first means associated with the stationary member and adjacent to the first side of the thrust disc, for generating an axially polarized, controllable electromagnetic field;

second means associated with the stationary member and adjacent to the second side of the thrust disc, for generating an axially polarized, controllable electromagnetic field;

first means associated with the stationary member and adjacent to the first side of the thrust disc, for generating a constant flux, high density magnetic field;

second means associated with the stationary member and adjacent to the second side of the thrust disc, for generating a constant flux, high density magnetic field; and means for directing substantially all magnetic flux from the first and second electromagnetic field generating means and the first and second constant flux magnetic field generating means, axially between the thrust disc and the stationary member, to provide controlled magnetic flux coupling of the rotatable member to the stationary member.

11. An electromagnetic thrust bearing as set forth in claim 10, wherein the first and second constant flux magnetic field generating means each include axially polarized, arcuately shaped permanent magnets.

12. An electromagnetic thrust bearing as set forth in claim 11, wherein the first and second means for generating an axially polarized, controllable electromagnetic field each include an electromagnetic coil circumferentially positioned about the rotatable member and axially spaced from the thrust disc.

13. An electromagnetic thrust bearing as set forth in claim 12, wherein the electromagnetic coils are axially aligned with the permanent magnets.

14. An electromagnetic thrust bearing as set forth in claim 12, wherein the stationary member includes spaced apart, facing first and second coil housings which circumferentially surround a portion of the rotatable member and wherein the thrust disc is situated between the facing coil housings.

15. An electromagnetic thrust bearing as set forth in claim 14, wherein the electromagnetic coils are axially aligned with one another and cooperatively generate a controllable, axially polarized electromagnetic field to magnetically link the thrust disc to the facing coil housings, wherein a magnetic flux path is provided for electromagnetically generated flux around the permanent magnets the electromagnetic coils.

16. An electromagnetic thrust bearing as set forth in claim 14, wherein each of the constant flux magnetic field generating means includes a pair of arcuately shaped permanent magnet rings which are radially spaced from one another and disposed adjacent to a respective axially facing side of the thrust disc.

17. An electromagnetic thrust bearing as set forth in claim 16, wherein each of the permanent magnet rings is linked magnetically to the adjacent coil housing by a respective ferromagnetic pole piece.

18. An electromagnetic thrust bearing as set forth in claim 10, including means for determining axial positioning of the rotatable member relative to the stationary member, and for controlling axial positioning of the thrust disc by varying the magnetic flux generated by the first and second electromagnetic field generating means.

19. An electromagnetic thrust bearing for axially flux coupling a rotatable member relative to a stationary member, the thrust bearing comprising:

a thrust disc fixed to and extending radially from the rotatable member, the thrust disc having first and second opposite, axially-facing, sides;

first means associated with the stationary member and adjacent to the first side of the thrust disc, for generating an axially polarized, controllable electromagnetic field, wherein the first electromagnetic field generating means includes a first solenoid having a first electromagnetic coil situated within a first ferromagnetic housing which circumscribes a portion of the rotatable member;

second means associated with the stationary member and adjacent to the second side of the thrust disc, for generating an axially polarized, controllable electromagnetic field, wherein the second electromagnetic field generating means includes a second solenoid having a second electromagnetic coil situated within a second ferromagnetic housing which circumscribes a portion of the rotatable member;

first means associated with the stationary member and adjacent to the first side of the thrust disc, for generating a constant flux, high density magnetic field, wherein the first constant flux magnetic field generating means includes a first pair of arcuately shaped, axially polarized permanent magnets radially spaced from one another and linked magnetically to the first ferromagnetic housing by respective pole pieces, and wherein the first pair of radially spaced permanent magnets are each linked magnetically to the thrust disc through a first air gap such that axially directed flux from the first pair of permanent magnets passes through the first air gap to create a high density magnetic field between the thrust disc and the stationary member;

second means associated with the stationary member and adjacent to the second side of the thrust disc, for generating a constant flux, high density magnetic field, wherein the second constant flux magnetic field generating means includes a second pair of arcuately shaped, axially polarized permanent magnets radially spaced from one another and linked magnetically to the second ferromagnetic housing by respective pole pieces, and wherein the second pair of radially spaced permanent magnets are each linked magnetically to the thrust disc through a second air gap such that axially directed flux from the second pair of permanent magnets passes through the second air gap to create a high density magnetic field between the thrust disc and the stationary member;

means for directing substantially all magnetic flux from the first and second electromagnetic field generating means and the first and second constant flux magnetic field generating means, axially between the thrust disc and the stationary member, to magnetically link the thrust disc to the solenoids and provide a magnetic flux path for the electromagnetically generated flux around the permanent magnets and the electromagnetic coils, and provide controlled magnetic flux coupling of the rotatable member to the stationary member; and means for determining axial positioning of the rotatable member relative to the stationary member, and for controlling axial positioning of the thrust disc by varying the magnetic flux generated by the first and second electromagnetic field generating means.

* * * * *